United States Patent
Cizio et al.

(10) Patent No.: US 11,659,853 B2
(45) Date of Patent: May 30, 2023

(54) ACID-OIL DISPERSION COATING FOR READY-TO-EAT CEREAL PIECE

(71) Applicant: Post Consumer Brands, LLC, Lakeville, MN (US)

(72) Inventors: Kevin A. Cizio, Minneapolis, MN (US); James T. Schultz, Maple Grove, MN (US); Alan B. Erickson, Northfield, MN (US)

(73) Assignee: Post Consumer Brands, LLC, Lakeville, MN (US)

( * ) Notice: Subject to any disclaimer, the term of this patent is extended or adjusted under 35 U.S.C. 154(b) by 837 days.

(21) Appl. No.: 16/281,548

(22) Filed: Feb. 21, 2019

(65) Prior Publication Data

US 2019/0364937 A1 Dec. 5, 2019

Related U.S. Application Data

(60) Provisional application No. 62/784,027, filed on Dec. 21, 2018, provisional application No. 62/680,076, filed on Jun. 4, 2018.

(51) Int. Cl.
*A23L 7/122* (2016.01)
*A23P 20/10* (2016.01)

(52) U.S. Cl.
CPC ............. *A23L 7/122* (2016.08); *A23P 20/11* (2016.08); *A23V 2002/00* (2013.01); *A23V 2200/16* (2013.01); *A23V 2250/032* (2013.01); *A23V 2250/1882* (2013.01); *A23V 2250/606* (2013.01); *A23V 2250/628* (2013.01)

(58) Field of Classification Search
CPC ..... A23L 7/122; A23P 20/11; A23V 2250/032
See application file for complete search history.

(56) References Cited

U.S. PATENT DOCUMENTS

| | | | |
|---|---|---|---|
| 2006/0286223 A1* | 12/2006 | Long | A23L 7/122 426/289 |
| 2007/0065542 A1* | 3/2007 | Pak | A61K 33/26 426/74 |
| 2007/0269577 A1* | 11/2007 | Pershad | A23G 3/54 426/607 |
| 2016/0073654 A1* | 3/2016 | Nagy | A23D 9/013 426/321 |

OTHER PUBLICATIONS

Okuro et al, "Technological Challenges for Spray Chilling Encapsulation of Functional Food Ingredients", Food Technolgy Biotechnology, 2013, pp. 171-182, vol. 51 No. 2.

* cited by examiner

*Primary Examiner* — Katherine D Leblanc
(74) *Attorney, Agent, or Firm* — Pauly, DeVries Smith & Deffner LLC

(57) ABSTRACT

An acid-oil dispersion composition for use in coating a cereal piece. The acid-oil dispersion composition comprising an edible acid particles dispersed in an edible oil component, wherein the acid particles are in a range of about 1 wt % to about 25 wt % of the acid-oil dispersion composition; and wherein the edible oil component is at an amount that is in a range of about 75 wt % to about 99 wt % of the acid-oil dispersion composition.

11 Claims, 1 Drawing Sheet

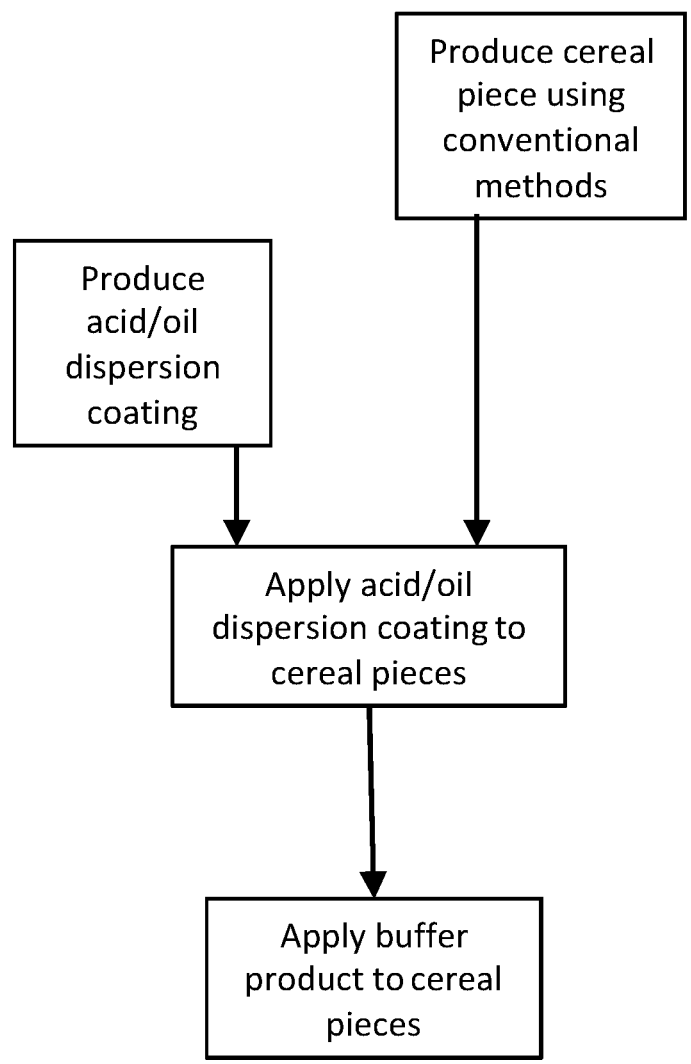

ACID-OIL DISPERSION COATING FOR READY-TO-EAT CEREAL PIECE

CROSS-REFERENCE TO RELATED APPLICATIONS

The present application is a non-provisional application claiming the benefit of U.S. Ser. No. 62/784,027, filed Dec. 21, 2018, and U.S. Ser. No. 62/680,076, filed Jun. 4, 2018, each of which is incorporated herein by reference in its entirety.

FIELD OF THE INVENTION

This disclosure pertains to a ready-to-eat cereal piece comprising an acid-oil dispersion coating. The acid-oil dispersion coating provides the cereal piece with a sour flavor when eaten.

BACKGROUND OF INVENTION

When using acids as a coating in a ready-to-eat cereal, for instance, a breakfast cereal, it is desirable to prevent curdling of milk when the cereal piece is exposed to milk. The curdling is generally caused by the acid reducing the pH of the milk which in turn causes protein to precipitate. A need still exists for an acid-containing coating for use with a ready-to-eat cereal piece, wherein said coating delays or prevents curdling of milk when the ready-to-eat cereal piece is exposed to milk.

SUMMARY OF INVENTION

One embodiment of the present invention is directed to an acid-oil dispersion composition for use in coating a cereal piece, the acid-oil dispersion composition comprising an acid component that is dispersed in an oil component, wherein:
the acid component comprises particles that comprise one or more edible acids, wherein the acid component has a particle size distribution such that no more than about 1 wt % of the particles are retained on a No. 16 U.S.A. Standard Testing Sieve and no less than about 95 wt % of the particles pass through a No. 30 U.S.A. Standard Testing Sieve, and wherein the acid component is at an amount that is in a range of about 1 wt % to about 25 wt % of the acid-oil dispersion composition; and
the oil component comprises one or more edible oils/fats, wherein the oil component has a dropping point as determined according to AOCS Cc18-80 that is in a range of about 70° F. to about 150° F., and wherein the oil component is at an amount that is in a range of about 75 wt % to about 99 wt % of the acid-oil dispersion composition.

One embodiment of the present invention is directed to a method of preparing the above-described acid-oil dispersion, the method comprising dispersing the acid component in the oil component to form the acid-oil dispersion composition.

One embodiment of the present invention is directed to a sour-coated cereal piece comprising a cereal piece and a sour coating on at least a portion of the cereal piece, wherein the sour coating comprises the above-described acid-oil dispersion.

One embodiment of the present invention is directed to a method of making a sour-coated cereal piece that comprises a cereal piece and a sour coating on at least a portion of the cereal piece, the method comprising: depositing the above-described acid-oil dispersion composition on at least a portion of the cereal piece, wherein the acid component is dispersed in an oil component which is in a liquid state; and decreasing the temperature of deposited acid-oil dispersion so that the oil component is in a solid state thereby forming the sour-coated cereal piece that comprises the cereal piece and the sour coating on at least a portion of the cereal piece.

One embodiment of the present invention is directed to a ready-to-eat cereal comprising a multiplicity of the above-described sour-coated cereal pieces.

BRIEF DESCRIPTION OF THE DRAWINGS

FIG. 1 is schematic diagram of a process that is an embodiment of the claimed invention.

DETAILED DESCRIPTION OF INVENTION

As set forth above, one embodiment of the present invention is directed to an acid-oil dispersion for use in coating a cereal piece, the acid-oil dispersion composition comprising an acid component that is dispersed in an oil component. Advantageously, when such a cereal piece with a sour coating is contacted with milk at temperatures conventional for consuming a cereal piece, the composition/structure of the sour coating (in which the oil component is a solid) limits and/or delays the contact of the milk with the acid component of the acid/oil dispersion coating, thus impeding the curdling of the milk while allowing a sour flavor to be imparted to the cereal piece when eaten.

Acid Component

Edible Acids

The acid component comprises particles that comprise one or more edible acids. In one embodiment, the edible acids are GRAS acids. Examples of edible acids include citric acid, tartaric acid, malic acid, acetic acid, lactic acid, phosphoric acid, fumaric acid, and combinations thereof.

The selection of the particular acid(s) may impact the character of sour flavor. For example, some acids may come on "smooth" vs "sharp." In particular, malic acid tends to come on smooth whereas tartaric acid, citric acid, and combinations thereof tend to come on sharp.

Additionally, the duration of the sour sensation varies by acid type. Examples of acids that tend to provide a longer sour sensation include malic acid and lactic acid, and combinations thereof. In contrast, tartaric acid tends to provide a shorter sour sensation. Further, the selection of acid may modify the overall flavor perception of the cereal to which the acid-oil dispersion is applied. For example, when the acid component is paired with a citrus fruity flavor in a cereal piece, acids such as citric acid, tartaric acid, and malic acid, and combinations thereof tend to be selected. In contrast, acetic acid, which is reminiscent of vinegar, tends not be a desirable pairing with fruit flavor.

Still further, acid strength tends to affect the degree of curdling of milk that will result if the acid component of a coated cereal is allowed to contact milk for a duration sufficient for the acid to dissolve into and interact with the milk. For example, higher strength acids like phosphoric acid and fumaric acid will tend to result in curdling faster and to a greater degree than lower strength acids like citric acid and lactic acid when used at the same level.

In one embodiment, the one or more edible acids are selected from the group consisting of citric acid, tartaric acid, malic acid, and combinations thereof In another embodiment, the one or more edible acids is citric acid.

Particle Size Distribution of the Edible Acids

The size(s) of the acid component particles also plays a role in certain properties of the acid-oil dispersion, a sour coating formed with said dispersion, and a cereal piece with said sour coating. For example, in addition to adjusting the selection of acid(s) (see above) and/or the amount of the acid component in the dispersion (see below), the particle size may be adjusted to alter: (a) the flavor profile, (b) the impact of the sourness when a cereal piece having a sour coating is eaten, and (c) the resistance to curdling. Results to date suggest that as the particle size increases, cereal pieces with a sour coating tend to cause curdling of milk to occur more quickly and the curdling tends to be at a larger degree. More particularly, selecting particle size distributions as disclosed herein resulted in the onset of curdling to be delayed about 8 to about 10 minutes after coming into contact with milk whereas particles sizes larger than those disclosed herein resulted in curdling occurring in as little as 2 minutes.

In one embodiment, the acid component has a particle size distribution such that no more than about 1 wt % of the particles are retained on a No. 16 U.S.A. Standard Testing Sieve and no less than about 95 wt % of the particles pass through a No. 30 U.S.A. Standard Testing Sieve.

In another embodiment, the particle size distribution of the acid component is such that no more than about 5 wt % of the particles are retained on a No. 60 U.S.A. Standard Testing Sieve and no less than about 25 wt % of the particles pass through a No. 200 U.S.A. Standard Testing Sieve.

In yet another embodiment, the particle size distribution of the acid component is such that no more than about 1 wt % of the particles are retained on a No. 100 U.S.A. Standard Testing Sieve and no less than about 95 wt % of the particles pass through a No. 200 U.S.A. Standard Testing Sieve.

Amount of Acid Component

The amount of acid in the acid-oil dispersion tends to impact the performance. In general, as the amount of acid component is increased relative to the oil component, the acid impact tends to increase and the resistance to curdling tends to decrease.

In one embodiment, the acid component is at an amount that is in a range of about 1 wt % to about 25 wt % of the acid-oil dispersion composition.

In another embodiment, the amount of the acid component is in a range of about 5 wt % to about 25 wt % of the acid-oil dispersion.

In yet another embodiment, the amount of the acid component is in a range of about 10 wt % to about 25 wt % of the acid-oil dispersion.

In still another embodiment, the amount of the acid component is in a range of about 10 wt % to about 20 wt % of the acid-oil dispersion.

Oil Component

Edible Oils/Fats

The oil component comprises one or more edible oils/fats. In one embodiment, the edible oils/fats are GRAS oils/fats. Examples of edible oils/fats include hydrogenated coconut oil, hydrogenated palm kernel oil, and combinations thereof.

In one embodiment, the one or more edible oils/fats are a combination of hydrogenated coconut oil and hydrogenated palm kernel oil.

Dropping Point

The oil component has a dropping point as determined according to AOCS Cc18-80 that is in a range of about 70° F. and to about 150° F. Products having dropping points at the higher temperatures of the foregoing range are often referred to as waxes rather than oils. To be clear, the term "oil/fats" as used herein is meant to include compounds/composition that may be referred to as waxes.

In one embodiment, the dropping point of the oil component is in a range of about 80° F. to about 130° F.

In another embodiment, the dropping point of the oil component is in a range of about 90° F. to about 110° F.

In yet another embodiment, the dropping point of the oil component is in a range of about 99° F. to about 106° F.

Amount of the Oil Component

In one embodiment, the oil component is at an amount that is in a range of about 75 wt % to about 99 wt % of the acid-oil dispersion composition.

In another embodiment, the amount of the oil component is in a range of about 75 wt % to about 95 wt % of the acid-oil dispersion composition.

In yet another embodiment, the amount of the oil component is in a range of about 75 wt % to about 90 wt % of the acid-oil dispersion composition.

In still another embodiment, the amount of the oil component is in a range of about 80 wt % to about 90 wt % of the acid-oil dispersion composition.

Method of Preparing the Acid-Oil Dispersion Composition

The method of preparing the acid-oil dispersion composition comprises dispersing the acid component in the oil component to form the acid-oil dispersion composition. For example, a dry granular acid component may be mixed with the oil component that is in a liquid state using a high-shear mixer to create a dispersion of acid component granules in the oil component. That said, high-shear mixer is not necessary and a conventional mixing system may be used In one embodiment, when forming the acid-oil dispersion, the oil component may be in a solid state or a liquid state. The state of the oil component is a function of the state of the one or more edible oils/fats that make up the oil component. The state of oil component is also a function of the temperature of the oil component during the dispersing operation. As such, it is possible that during the dispersal, one or more of the edible oil/fats the oil component may be in a solid state and one or more of the edible oil/fats may be in a liquid state.

In another embodiment, the oil component is in a liquid state. Typically, this dispersion is accomplished by heating the oil component so that the temperature of the oil component is above its dropping point.

Sour-Coated Cereal Piece

Another embodiment of the present invention is directed to a sour-coated cereal piece comprising a cereal piece and a sour coating on at least a portion of the cereal piece, wherein the sour coating comprises an acid-oil dispersion composition, wherein the acid-oil dispersion composition comprises an acid component that is dispersed in an oil component. At temperatures conventional for the transportation, storage, and consumption of a ready-to-eat cereal, the oil component is a solid. Thus, when a cereal piece with the sour coating is contacted with milk, the composition/structure of the sour coating (in which the oil component is a solid) limits the contact of the milk with the acid component of the acid/oil dispersion coating, thus impeding the curdling of the milk while allowing a sour flavor to be imparted to the cereal piece when eaten.

Grain-Based Core

The cereal piece comprises a grain-based core. In one embodiment, the grain-based core is about 50 wt % to about 60 wt % of the sour-coated cereal piece, and the sour coating is about 5 wt % to about 15 wt % of the sour-coated cereal piece.

In one embodiment, the grain-based core is in a form selected from the group consisting of flake, extrusion, puff, sheeted, baked, shredded, and uncooked grain.

In one embodiment, the grain of the grain-based core is selected from the group consisting of corn, wheat, oats, rice, and combinations thereof.

In another embodiment, the grain of the grain-based core is a combination of corn, wheat, and oats.

Sweet Coating

In one embodiment, the cereal piece further comprises a sweet coating on at least a portion of the grain-based core. In one such embodiment, the sweet coating comprises sucrose, corn syrup, high fructose corn syrup, and combinations thereof.

In another embodiment, the sweet coating is on essentially the entire grain-based core.

In one embodiment, the sweet coating is about 30 wt % to about 45 wt % of the sour-coated cereal piece.

In one embodiment, the sweet coating comprises about 90 to about 100% dry weight sucrose and 0 to about 10% dry weight corn syrup.

Buffer Product

In certain embodiments, the sour-coated cereal piece further comprises buffer particles adhered to at least a portion of the sour coating. The buffer particles have a particle size distribution such that no more than about 5 wt % of the particles are retained on a No. 30 U.S.A. Standard Testing Sieve and no more than about 10 wt % of the particles pass through a No. 100 U.S.A. Standard Testing Sieve/The buffer particles further reduce the propensity the acid component to cause curdling when the cereal piece is contacted with milk.

The buffer particles may be applied by any appropriate method using applicable equipment. For example, the buffer particles may be applied to the cereal pieces in a coating drum after application of the acid-oil dispersion. This allows the buffer particles to tack-on the oil component of the applied acid/oil dispersion. Alternatively, the buffer particles may be applied to cereal pieces with the applied acid-oil dispersion using conventional dry feeding equipment.

In one embodiment, the buffer particles comprise a compound selected from the group consisting of trisodium citrate, trisodium phosphate, calcium citrate, and combinations thereof.

In one embodiment, the buffer particles are about 0.5 wt % to about 2 wt % of the sour-coated cereal piece.

Method of Making a Sour-Coated Cereal Piece

Another embodiment of the invention is directed to a method of making a sour-coated cereal piece that comprises a cereal piece and a sour coating on at least a portion of the cereal piece. The method comprises depositing an acid-oil dispersion composition on at least a portion of the cereal piece, wherein the acid-oil dispersion composition comprises an acid component that is dispersed in an oil component which is in a liquid state. The method also comprises decreasing the temperature of deposited acid-oil dispersion so that the oil component is in a solid state thereby forming the sour-coated cereal piece that comprises the cereal piece and the sour coating on at least a portion of the cereal piece.

Referring to FIG. 1, before application of the acid-oil dispersion coating, the cereal pieces may be produced using conventional methods. Accordingly, the cereal pieces may be of any type of ready-to-eat cereal including formed as a flake, an extruded piece, a puff, sheeted, baked, shredded, or other uncooked grain, and the cereal pieces may have a sweet coating or may be uncoated. The acid-oil dispersion coating may be applied to the cereal pieces using conventional spraying equipment and a conventional coating drum. The acid-oil dispersion coating may be staged for application onto the cereal pieces during production. The acid-oil dispersion may be produced in the cereal processing facility or produced elsewhere and transported to the cereal processing facility for application to the cereal pieces during production. In accordance with another aspect, the buffer particles are also fed into the coating drum and allowed to tack-on to the oily surface of the cereal pieces.

Ready-To-Eat Cereal

Another embodiment of the invention is directed to a ready-to-eat cereal comprising a multiplicity of sour-coated cereal pieces, wherein each sour-coated cereal piece comprises a cereal piece and a sour coating on at least a portion of the cereal piece, wherein the sour coating comprises an acid-oil dispersion composition, wherein the acid-oil dispersion composition comprises an acid component that is dispersed in an oil component.

In one embodiment, the ready-to-eat cereal consists of a multiplicity of sour-coated cereal pieces.

Having illustrated and described the principles of the present invention, it should be apparent to persons skilled in the art that the invention can be modified in arrangement and detail without departing from such principles.

Although the materials and methods of this invention have been described in terms of various embodiments and illustrative examples, it will be apparent to those of skill in the art that variations can be applied to the materials and methods described herein without departing from the concept, spirit and scope of the invention. All such similar substitutes and modifications apparent to those skilled in the art are deemed to be within the spirit, scope and concept of the invention as defined by the appended claims.

EXAMPLES

Preparation of an Acid-Oil Dispersion

An acid-oil dispersion was prepared by mixing together about 15% by weight of an acid component and about 85% by weight of an oil component using a high speed mixer in a heated kettle maintained at a temperature of about 130° F. The acid component consisted of a powdered anhydrous citric acid with a granulation of about 5% maximum on a on a No. 60 U.S.A. Standard Testing Sieve and about 25% minimum through a No. 200 U.S.A. Standard Testing Sieve. The oil component consisted of hydrogenated coconut oil and hydrogenated palm kernel oil. The oil component had a dropping point in a range of about 99 to about 105° F. The oil component was heated to about 130° F. prior to the introduction of the acid component.

Application of the Acid-Oil Dispersion on Ready-to-Eat Cereal Pieces

Referring to FIG. 1, the prepared acid-oil dispersion was kept at about 130° F. and pumped into a 2-nozzle spray system that fanned the acid-dispersion onto a base sweetened cereal near the inlet of a continuous enrobing drum. The cereal base and applied oil-acid dispersion were agitated through the enrobing drum for approximately 30 seconds before the product exited the drum. Approximately halfway through the drum a dry feeder auger was used to drop a trisodium citrate buffer onto the product to tack-on to the acid-oil dispersion coated onto the cereal pieces. Also, approximately halfway through the drum a single spray nozzle was used to spray a liquid fruit flavor onto the cereal pieces. The resulting combination comprise about 90 wt. % base sweetened cereal, about 8 wt. % acid-oil dispersion, about 1% liquid fruit flavor, and about 1% trisodium citrate.

As the blended product (i.e., the cereal pieces coated with the acid-oil dispersion, buffer, and fruit flavor) passed through the enrober, it cools and the acid-oil dispersion solidified by the time the blended product exited the enrober or shortly thereafter.

What is claimed is:

1. A sour-coated cereal piece comprising a cereal piece and a sour coating on at least a portion of the cereal piece, wherein the sour coating comprises a solidified acid-oil dispersion composition that comprises an acid component that is dispersed in an oil component, wherein:
the acid component comprises particles that comprise one or more edible acids, wherein the acid component has a particle size distribution such that no more than about 1 wt % of the particles are retained on a No. 16 U.S.A. Standard Testing Sieve and no less than about 95 wt % of the particles pass through a No. 30 U.S.A. Standard Testing Sieve, and wherein the acid component is at an amount that is in a range of about 1 wt % to about 25 wt % of the acid-oil dispersion composition; and
the oil component comprises one or more edible oils/fats, wherein the oil component has a dropping point as determined according to AOCS Cc18-80 that is in a range of about 70° F. to about 150° F., and wherein the oil component is at an amount that is in a range of about 75 wt % to about 99 wt % of the acid-oil dispersion composition.

2. The sour-coated cereal piece of claim 1, wherein:
the one or more edible acids are selected from the group consisting of citric acid, tartaric acid, malic acid, acetic acid, lactic acid, phosphoric acid, fumaric acid, and combinations thereof;
the one or more edible oils/fats are selected from the group consisting of hydrogenated coconut oil, hydrogenated palm kernel oil, and combinations thereof.

3. The sour-coated cereal piece of claim 1, wherein the cereal piece comprises a grain-based core, and wherein the grain-based core is about 50 wt % to about 60 wt % of the sour-coated cereal piece, and the sour coating is about 5 wt % to about 15 wt % of the sour-coated cereal piece.

4. The sour-coated cereal piece of claim 3, wherein the cereal piece further comprises a sweet coating on at least a portion of the grain-based core, wherein the sweet coating comprises sucrose, corn syrup, high fructose corn syrup, or a combination thereof, and wherein the sweet coating is about 30 wt % to about 45 wt % of the sour-coated cereal piece.

5. The sour-coated cereal piece of claim 1 further comprising buffer particles adhered to at least a portion of the sour coating, wherein the buffer particles have a particle size distribution such that no more than about 5 wt % of the particles are retained on a No. 30 U.S.A. Standard Testing Sieve and no more than about 10 wt % of the particles pass through a No. 100 U.S.A. Standard Testing Sieve, wherein the buffer particles comprise a compound selected from the group consisting of trisodium citrate, trisodium phosphate, calcium citrate, and combinations thereof, and wherein the buffer particles are about 0.5 wt % to about 2 wt % of the sour-coated cereal piece.

6. The sour-coated cereal piece of claim 1, wherein:
the particle size distribution of the acid component is such that no more than about 1 wt % of the particles are retained on a No. 100 U.S.A. Standard Testing Sieve and no less than about 95 wt % of the particles pass through a No. 200 U.S.A. Standard Testing Sieve;
the amount of the acid component is in a range of about 10 wt % to about 20 wt % of the acid-oil dispersion;
the one or more edible acids is citric acid;
the dropping point of the oil component is in a range of about 99° F. to about 106° F., and the amount of the oil component is in a range of about 80 wt % to about 90 wt % of the acid-oil dispersion composition;
the one or more edible oils/fats are a combination of hydrogenated coconut oil and hydrogenated palm kernel oil; and
the sour coating is about 5 wt % to about 15 wt % of the sour-coated cereal piece; and
the cereal piece comprises:
a grain-based core, wherein the grain-based core is about 50 wt % to about 60 wt % of the sour-coated cereal piece, wherein the grain-based core is a puff, wherein the grain of the grain-based core is a combination of corn, wheat, and oats; and
a sweet coating on at least a portion of the grain-based core, wherein the sweet coating comprises sucrose, and wherein the sweet coating is about 30 wt % to about 45 wt % of the sour-coated cereal piece; and
the sour-coated cereal piece further comprises buffer particles adhered to at least a portion of the sour coating, wherein the buffer particles have a particle size distribution such that no more than about 5 wt % of the particles are retained on a No. 30 U.S.A. Standard Testing Sieve and no more than about 10 wt % of the particles pass through a No. 100 U.S.A. Standard Testing Sieve, wherein the buffer particles comprise trisodium citrate, wherein the buffer particles are about 0.5 wt % to about 2 wt % of the sour-coated cereal piece.

7. A ready-to-eat cereal comprising a multiplicity of sour-coated cereal pieces, wherein each sour-coated cereal piece comprises a cereal piece and a sour coating on at least a portion of the cereal piece, wherein the sour coating comprises a solidified acid-oil dispersion composition that comprises an acid component that is dispersed in an oil component, wherein:
the acid component comprises particles that comprise one or more edible acids, wherein the acid component has a particle size distribution such that no more than about 1 wt % of the particles are retained on a No. 16 U.S.A. Standard Testing Sieve and no less than about 95 wt % of the particles pass through a No. 30 U.S.A. Standard Testing Sieve, and wherein the acid component is at an amount that is in a range of about 1 wt % to about 25 wt % of the acid-oil dispersion composition; and
the oil component comprises one or more edible oils/fats, wherein the oil component has a dropping point as determined according to AOCS Cc18-80 that is in a range of about 70° F. to about 150° F., and wherein the oil component is at an amount that is in a range of about 75 wt % to about 99 wt % of the acid-oil dispersion composition.

8. The ready-to-eat cereal of claim 7 consisting of the multiplicity of sour-coated cereal pieces.

9. The sour-coated cereal piece of claim 1, wherein:
the one or more edible acids are selected from the group consisting of citric acid, tartaric acid, malic acid, acetic acid, lactic acid, phosphoric acid, fumaric acid, and combinations thereof; and
the one or more edible oils/fats are selected from the group consisting of hydrogenated coconut oil, hydrogenated palm kernel oil, and combinations thereof.

10. The ready-to-eat cereal of claim 7, wherein:
the one or more edible acids are selected from the group consisting of citric acid, tartaric acid, malic acid, acetic acid, lactic acid, phosphoric acid, fumaric acid, and combinations thereof; and
the one or more edible oils/fats are selected from the group consisting of hydrogenated coconut oil, hydrogenated palm kernel oil, and combinations thereof.

11. A ready-to-eat to cereal product comprising
a cereal piece, and
a coating disposed over the cereal piece, wherein the coating comprises
  about 75 wt % to about 99 wt % of an oil component phase; and
  particles of one or more edible acids distributed throughout the oil component phase;
wherein the oil component has a dropping point as determined according to AOCS Cc18-80 that is in a range of about 70° F. to about 150° F.; and
wherein the acid component has a particle size distribution such that no more than about 1 wt % of the particles are retained on a No. 16 U.S.A. Standard Testing Sieve and no less than about 95 wt % of the particles pass through a No. 30 U.S.A. Standard Testing Sieve.

* * * * *